O. H. ESCHHOLZ.
ELECTRIC ARC WELDING SYSTEM.
APPLICATION FILED OCT. 6, 1919.
1,416,007. Patented May 16, 1922.
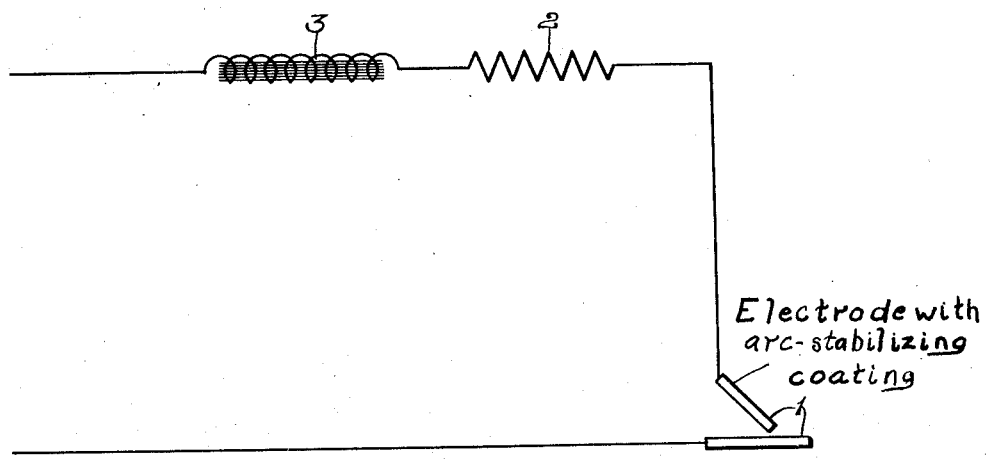
WITNESSES:
J. B. Merrill
O. E. Bee.
INVENTOR
Otto H. Eschholz.
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,416,007.  Specification of Letters Patent.  Patented May 16, 1922.

Application filed October 6, 1919. Serial No. 328,774.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electric-Arc-Welding Systems, of which the following is a specification.

My invention relates to arc welding systems and it has, for its primary object, the provision of arc welding systems which may utilize alternating current and which shall be simple in construction and possess such characteristics as to ensure the production of strong and homogeneous welds.

It has been found possible to weld by employing an alternating-current, 60 cycle supply circuit having a voltage of the order of 110 volts, but such a welding circuit possesses characteristics which necessitate the employment of skilled operators in order to obtain satisfactory welds. In order to improve the ease of operation of alternating-current welding systems, it has been proposed to employ a relatively large reactance in the welding circuit which stabilizes the arc, but which, however, reduces the power factor to a relatively low value and, therefore, imposes an undesirable load upon commercial power circuits.

One object of my invention, therefore, resides in the provision of an alternating-current welding system in which ease of operation is obtained without employing sufficient reactance to reduce the power factor to an undesirable value.

A still further object of my invention is to provide alternating-current welding systems in which no complicated or moving apparatus is necessary to ensure the production of good welds by moderately skilled workmen.

One of the inherent disadvantages of alternating-current welding systems is the difficulty which is experienced in establishing an arc and this difficulty is believed to result from the reversals of current. I have found, however, that the ease of establishing an arc may be greatly facilitated if a relatively high voltage is employed during the period of establishing the arc. Another object of my invention resides, therefore, in the provision of alternating-current welding systems in which a relatively high voltage may be employed to facilitate the establishment of an arc.

With these and other objects in view, my invention will be more fully described hereinafter and illustrated in the drawing which is a diagram of a welding system embodying my invention.

In practising my invention, I may provide a welding system by employing a plurality of arc-stabilizing electrodes, such as coated, covered, or cored electrodes, several of which are well known to those familiar with the art. I have found that satisfactory welds may be produced by employing electrodes of the above designated type in a welding circuit in which a power factor of substantially 100% obtains. However, I have found that it is expedient to employ a small reactance to improve the characteristics of the system to such an extent that relatively unskilled workmen may establish and maintain an arc. The reactance need not be large enough to materially reduce the power factor when arc-stabilizing electrodes are employed, I have found that it is also advantageous to employ a resistor in the welding circuit which permits of the employment of a higher open-circuit voltage which, therefore, increases the ease of establishment of an arc.

I am aware that welding circuits have been proposed in which a reactance was employed, connected in series with the electrodes, to increase the arc stability, and, therefore, to improve the operation of the systems, but my invention contemplates the employment of a much smaller reactance than has been considered feasible heretofore. The employment of a small reactance is made possible by utilizing the arc-stabilizing electrodes, which, in combination with a reactance, impart such characteristics to a welding system as to make it possible for moderately skilled workmen to establish and maintain an arc by means of alternating current.

In the drawing is shown a welding circuit comprising a plurality of electrodes 1, one of which is connected in series with a resistor 2 and a reactance 3. The electrodes 1 may be directly connected to a suitable alternating-current supply circuit to complete an operable welding system.

Ordinarily, the electrodes consist of metal which is to be repaired and an electrode or pencil of repair metal and, in this case, the pencil or electrode, which deposits the repair metal, is of some covered, coated, or cored type, several different types of which are well known to those familiar with the art. The function of the coated or covered electrode is to increase the stability of the arc, and, therefore, to improve the operation of the system. It may be employed, furthermore, to deposit certain ingredients in the fused metal of the weld to impart greater strength, ductility, or certain other desired characteristics to the finished weld. The covered electrode may be of such character as to produce a mantle of inert gas which protects the vaporized metal in the arc stream and prevents oxidization of it. The slag content, strength, and ductility of the joint is, therefore, materially increased by employing an electrode of this type. Hereafter, when electrodes are referred to as coated, the term is employed to cover broadly any such type of electrode that imparts an arc-stabilizing effect, such as may be had by the different types of electrodes above mentioned.

An operable system may be provided by employing merely the coated electrodes, but I have found that the operating characteristics may be materially improved by employing a reactance to further increase the stability of the arc. The resistor is also an advantage because a higher open-circuit voltage may be employed which improves the starting characteristics of the system and adds to the stabilizing effect under welding conditions. The reactance may be of such value as to obtain any desired power factor, but I have found that a very satisfactory system may be provided if the reactance is of such value that a power factor in the neighborhood of 80% obtains, under welding conditions. Furthermore, by employing a resistor in series with the reactance, a slightly larger reactance may be employed without further reducing the value of the power factor.

It will be appreciated that the above described system is extremely simple and, therefore, relatively inexpensive and readily portable. On account of the fact that the system is simple in construction, additional apparatus may be employed to either increase the starting voltage or the value of the starting current and to automatically reduce either the voltage or the current to a suitable operating value without producing a system which is too complicated or bulky for commercial application. A distinct advantage is gained, therefore, by employing a simple system which may be supplemented by equipment to produce a commercial system having exceptionally good starting and operating characteristics.

Alternating-current welding systems have been provided by employing a reactance in series with a plurality of electrodes, but such systems contemplated operating with a power factor in the neighborhood of 30 to 40%. According to my invention, I have provided an operable welding system which is as simple in construction as systems employed heretofore, but which offers a more desirable load for commercial power circuits because it may be operated to obtain satisfactory results with a power factor in the neighborhood of 80%. Although my system is simple in construction, it possesses such characteristics that moderately skilled operators may produce strong and homogeneous welds with little difficulty.

Although I have shown and specifically described a welding system which may be operated from an alternating-current supply circuit, it is obvious that minor changes may be made in the apparatus employed and in the disposition of the apparatus in the system without departing from the spirit or scope of my invention, and I desire, therefore, that no limitations shall be imposed except such as are indicated in the appended claims.

I claim as my invention:—

1. An arc welding system comprising a plurality of electrodes, one of which is coated, and a reactance connected in series with one of the electrodes, said system having a power factor of at least 80%.

2. An arc welding system comprising a plurality of electrodes, one of which is coated, a reactance connected in series with one of the electrodes and a resistor connected in series with the reactance, said system having a power factor of at least 80%.

3. A system for making a metallic deposit upon a metallic surface comprising a coated metallic electrode so connected in an electric circuit with the metal receiving the deposit that an electric arc may be drawn between them, said circuit including a source of alternating current and having inductance of such value that the inductive voltage component is less than the voltage drop across the arc.

4. A system for making a metallic deposit upon a metallic surface comprising a coated metallic electrode so connected in an electric circuit with the metal receiving the deposit that an electric arc may be drawn between them, said circuit including a source of alternating current and having inductance of such value that a power factor of substantially 80% obtains when the system is in operation.

5. An arc welding system comprising a plurality of electrodes, one of which is coated, a resistor connected in series with one of the electrodes and a reactance connected in series with one of the electrodes of such value that the inductive voltage component is substantially less than the sum of the voltage drops across the resistor and an arc drawn between the electrodes.

In testimony whereof, I have hereunto subscribed my name this 30th day of Sept. 1919.

OTTO H. ESCHHOLZ.